United States Patent
Nip

(10) Patent No.: US 8,470,727 B2
(45) Date of Patent: Jun. 25, 2013

(54) METAL CARBOXYLATE CLAYS, DERIVATIVES OF METAL CARBOXYLATE CLAYS, METHODS FOR MAKING THE SAME, AND COMPOSITIONS CONTAINING THE SAME

(76) Inventor: Raymond L. Nip, Bangkok (TH)

( * ) Notice: Subject to any disclaimer, the term of this patent is extended or adjusted under 35 U.S.C. 154(b) by 0 days.

(21) Appl. No.: 13/095,791

(22) Filed: Apr. 27, 2011

(65) Prior Publication Data
US 2012/0276316 A1 Nov. 1, 2012

(51) Int. Cl.
*B60C 15/06* (2006.01)
(52) U.S. Cl.
USPC ............. 502/80; 524/523; 524/533; 524/445; 524/447
(58) Field of Classification Search
None
See application file for complete search history.

(56) References Cited

U.S. PATENT DOCUMENTS

| | | | |
|---|---|---|---|
| 4,546,126 A | 10/1985 | Breitenfellner et al. | |
| 4,836,946 A | 6/1989 | Dixit | |
| 5,429,999 A | 7/1995 | Nae et al. | |
| 5,672,639 A | 9/1997 | Corvasce et al. | |
| 5,684,077 A | 11/1997 | Tracey et al. | |
| 5,840,795 A | 11/1998 | Freeman et al. | |
| 5,866,265 A | 2/1999 | Reilly et al. | |
| 6,013,699 A | 1/2000 | Freeman et al. | |
| 6,028,137 A | 2/2000 | Mahmud et al. | |
| 6,159,613 A | 12/2000 | Reilly et al. | |
| 6,427,738 B1 | 8/2002 | Fujino et al. | |
| 6,512,035 B1 | 1/2003 | Hergenrother et al. | |
| 6,706,804 B2 | 3/2004 | Resendes | |
| 6,794,428 B2 | 9/2004 | Burrington et al. | |
| 6,797,757 B2 | 9/2004 | Wideman et al. | |
| 6,841,607 B2 * | 1/2005 | Twardowska-Baxter et al. ............................ | 524/445 |
| 6,858,665 B2 | 2/2005 | Larson | |
| 7,055,566 B2 | 6/2006 | Ajbani et al. | |
| 7,241,831 B2 | 7/2007 | Waddell et al. | |
| 7,294,664 B2 | 11/2007 | Jones et al. | |
| 7,312,271 B2 | 12/2007 | Chen et al. | |
| 7,407,999 B2 | 8/2008 | Tsou et al. | |
| 7,491,764 B2 | 2/2009 | Dias et al. | |
| 7,572,855 B2 | 8/2009 | Fudemoto et al. | |
| 7,601,772 B2 | 10/2009 | Fudemoto et al. | |
| 7,605,205 B2 | 10/2009 | Gong et al. | |
| 7,635,729 B2 * | 12/2009 | Nip ............................... | 523/205 |
| 7,638,573 B2 | 12/2009 | Wang et al. | |
| 7,714,055 B2 | 5/2010 | Zanzig et al. | |
| 7,770,621 B2 | 8/2010 | Tracey et al. | |
| 7,772,308 B2 | 8/2010 | Tracey et al. | |
| 7,790,798 B2 | 9/2010 | Chen et al. | |
| 2005/0090584 A1 * | 4/2005 | Powell .......................... | 523/210 |
| 2009/0156722 A1 | 6/2009 | Khanna et al. | |
| 2009/0194214 A1 | 8/2009 | Galimberti et al. | |
| 2009/0199945 A1 * | 8/2009 | Galimberti et al. ........... | 152/541 |
| 2010/0316582 A1 | 12/2010 | Tsuzuki et al. | |

OTHER PUBLICATIONS

A general approach to rubber-montmorillonite nanocomposites: Intercalation of steraci acid. AMit Das et al. Elseview 2010. available on line Nov. 23, 2010.*
International Search Report and Written Opinion; International Application No. PCT/US2012/045982; Dated Sep. 21, 2012; 11 pages; International Searching Authority / United States, Commissioner for Patents, Alexandria, Virginia.

* cited by examiner

*Primary Examiner* — Melvin C Mayes
*Assistant Examiner* — Colette Nguyen
(74) *Attorney, Agent, or Firm* — The Law Offices of Andrew D. Fortney; Andrew D. Fortney

(57) ABSTRACT

Zinc carboxylate clays and zinc carboxylate organoclays, methods for their preparation, and compositions containing the same are disclosed. The methods comprise either mixing a zinc clay composition with a carboxylic acid, or mixing a carboxylic acid with a zinc ammonia complex solution, then combining the resulting zinc carboxylate salt with a slurry or suspension of a cation-exchangeable clay, to prepare the zinc carboxylate clay. These clays can be further intercalated with quaternary ammonium salts to make zinc carboxylate organoclays. The present clays may be used in compositions and/or as additives in rubber and plastic formulations and products and in catalyst formulations.

21 Claims, 2 Drawing Sheets

US 8,470,727 B2

METAL CARBOXYLATE CLAYS, DERIVATIVES OF METAL CARBOXYLATE CLAYS, METHODS FOR MAKING THE SAME, AND COMPOSITIONS CONTAINING THE SAME

RELATED APPLICATIONS

This application may be related to U.S. Pat. No. 7,635,729 and/or U.S. patent application Ser. Nos. 12/346,535 and/or 12/577,370, filed Dec. 30, 2008 and Oct. 12, 2009, respectively, the relevant portions of each of which is incorporated herein by reference.

FIELD OF THE INVENTION

The present invention generally relates to the field of zinc carboxylate clays and zinc carboxylate clays intercalated with quaternary ammonium salts (e.g., zinc carboxylate organoclays), methods for making zinc carboxylate clays and zinc carboxylate organoclays, and various applications of such zinc carboxylate clays and zinc carboxylate organoclays, including applications in products made from rubber, plastic, other polymer materials and the like, in which the zinc carboxylate clays and organoclays function, e.g., as one or more of an anti-reversion agent, a vulcanization activator and/or accelerator, a rheology modifying agent, a filler and/or a reinforcing agent (especially in rubber tires).

DISCUSSION OF THE BACKGROUND

Zinc compounds, zinc clays and other additives can be used in rubber compounding (e.g., in the manufacture of tires) to obtain desired properties in a finished rubber product. There have been efforts to use zinc montmorillonite clay to replace zinc oxide in rubber compounding to reduce the amount of zinc oxide used in such rubber compounds for both environmental and economic reasons. Such zinc montmorillonite clays are usually made by mixing sodium montmorillonite with zinc chloride to exchange zinc ions with sodium ions in the clay (e.g., as described in PCT/NL2003/000880, the relevant portions of which are incorporated herein by reference). The clay is then washed free of sodium chloride and excess zinc chloride, then dried and milled to form a zinc clay suitable for use as rubber activator.

Organoclays may also used in rubber and plastic compositions as fillers. These organoclay fillers are usually made from smectic clays such as calcium montmorillonite, sodium montmorillonite, saponites, nontronites, beidellites, hecorites, etc. These minerals in turn are dominant parts of bentonite rock. Such clays may be treated with acid, then washed free of the acid and other soluble matter, then converted to their corresponding sodium salts by treatment with soda ash or caustic soda. In one process, a sodium montmorillonite clay is then reacted with quaternary ammonium chloride salts (e.g., dimethyl bis-(hydrogenated tallowalkyl) ammonium chloride) or amines (e.g., laurylamine or tallow-alkyl amine) and their salts to form an organoclay. The quaternary ammonium salt intercalates between platelets and/or layers of the clay, helping to expand the interlayer distance in the clay to about 20 angstroms or more. Such intercalation into the clay platelets results in easier exfoliation of the clay during rubber compounding or plastic processing. The exfoliation aids in dispersion of the nanoscale platelets from the clay into various compositions, and imparts various properties like higher hardness, modulus, heat resistance, etc. to products containing such intercalated clays.

It is known that using a zinc soap of a carboxylic acid, dry milled with a layered material of nanoscale thickness, can act as activator in rubber formulations, as mentioned in US Pat. Appl. Publ. No. 2009/0199945 A1. This patent publication uses mostly montmorillonite clay material. Using a zinc clay as described in U.S. patent application Ser. No. 12/577,370 as a starting material, the performance of the layered material can be further improved, especially as a filler for rubber compounds and formulations. It was also discovered that a zinc ammonia carbonate complex solution as described in U.S. patent application Ser. No. 12/577,370 is also an excellent starting material for making the zinc soap layered clay material.

The layers of those clay materials are usually from a few angstroms to about 15 angstroms apart in their natural form. In that form, the layers are difficult to break apart. It is known that if the layers can be intercalated to 20 angstroms or more, it is easier to break apart the clay layers. The $D_{001}$ parameter is usually used to indicate the largest gap of the platy layers. If it is 20 angstroms or more, the clay layers are more easily broken apart.

Stearic acid and its various metal salts are widely used in the rubber and plastic industries. Stearic acid is also widely available and inexpensive. Stearic acid and its metal salts are also highly compatible with various rubber and plastic formulations, and they can act like quaternary ammonium chlorides on layered clays.

SUMMARY OF THE INVENTION

Embodiments of the present invention relate to zinc carboxylate clays and organoclays, methods of making zinc carboxylate clays and zinc carboxylate organoclays, and various applications of such zinc carboxylate clays and organoclays, including applications in rubber and other polymer materials and the like, in which the zinc clay functions, e.g., as one or more of an anti-reversion agent, a vulcanization activator and/or accelerator, a rheology modifying agent, a filler and/or a reinforcing agent for rubber or plastics (especially in tires).

In one aspect, the present invention provides methods for making a zinc carboxylate clay, comprising mixing (i) a carboxylic acid or an ammonium salt of the organic acid (e.g., in the presence of ammonia or an ammonia-containing solution) with (ii) a zinc-containing clay (e.g., a cation-exchangeable clay containing chemically-bound zinc ions) to form a clay slurry; attrition milling and/or heating the clay slurry to incorporate the organic acid into the zinc-containing clay and form the zinc carboxylate clay, and optionally, heating to remove substantially all ammonia in the clay slurry; and filtering and drying the zinc carboxylate clay. In some embodiments, the method comprises mixing a zinc clay derived from a cation exchangeable clay with the carboxylic acid or an ammonium salt of the carboxylic acid to form the zinc carboxylate clay. In other embodiments, the carboxylic acid is selected from the group consisting of $C_5$ to $C_{24}$ aliphatic and/or aromatic carboxylic acids. This aspect of the present invention also provides a method for preparing a zinc carboxylate organoclay (i.e., a zinc- and organoamine-containing clay), comprising performing the method for making a zinc carboxylate clay, and mixing an organic amine or an organic ammonium salt with the zinc carboxylate clay under conditions sufficient to intercalate the amine or ammonium salt into the zinc carboxylate clay and form the zinc carboxylate organoclay.

In another aspect, the present invention provides a method for preparing a zinc organoclay, comprising mixing (i) a carboxylic acid an ammonium salt of the carboxylic acid with (ii) a zinc-containing cation exchangeable clay under conditions sufficient to intercalate the organic acid into the zinc-containing cation exchangeable clay and form a zinc carboxylate clay; and isolating the zinc carboxylate clay. In various embodiments, mixing the carboxylic acid or ammonium salt thereof with the zinc-containing clay comprises heating the zinc-containing clay and the carboxylic acid or the ammonium salt thereof at a temperature sufficient to facilitate the incorporation of the carboxylic acid or ammonium salt into zinc-containing clay. In other embodiments, the method further comprises preparing the zinc-containing clay by a process comprising mixing (i) a solution of zinc ammonia carbonate or a zinc salt with (ii) a cation-exchangeable clay under conditions sufficient to chemically bind at least a portion of the zinc to the cation-exchangeable clay and form a zinc-containing clay; and isolating the zinc-containing clay. The carboxylic acid or ammonium salt thereof can be mixed with the zinc-containing clay by mixing the zinc-containing clay with a solution of the ammonium salt of the carboxylic acid, the solution optionally further containing dissolved carbon dioxide; mixing a slurry of the zinc-containing clay with the carboxylic acid; or spraying a solution of the ammonium salt of the carboxylic acid onto the zinc-containing clay. As for the method for preparing a zinc carboxylate organoclay, a zinc carboxylate organoclay can be made by performing the method for making a zinc carboxylate clay, and mixing an amine or an ammonium salt with the zinc carboxylate clay under conditions sufficient to intercalate the amine or ammonium salt into the zinc carboxylate clay.

In yet another aspect, the present invention provides a method for preparing a zinc carboxylate clay, comprising mixing (i) a carboxylic acid with (ii) a zinc ammonia complex solution to form a zinc carboxylate salt; combining the zinc carboxylate salt with a slurry or suspension of a cation-exchangeable and/or layered clay under conditions sufficient to increase the spacing of layers of the cation-exchangeable clay and form the zinc carboxylate clay; and isolating the zinc carboxylate clay. In one embodiment, the zinc ammonia complex solution comprises a solution of a zinc ammonia carbonate complex. In further embodiments, the method further comprises mixing an amine or an ammonium salt with the zinc carboxylate clay under conditions sufficient to intercalate the amine or ammonium salt into the zinc carboxylate clay.

Further aspects of the present invention provide a zinc carboxylate clay, comprising a cation-exchangeable clay; zinc ions, at least a portion of which are chemically bound to the cation-exchangeable clay; and a carboxylic acid, intercalated into the cation-exchangeable clay. In some embodiments, the zinc carboxylate clay contains from about 1 wt % to about 20 wt % of zinc ions, and the zinc ions are substantially insoluble in an aqueous solution of ammonia and carbon dioxide water. In further embodiments, the zinc carboxylate clay further comprises an ammonium salt intercalated into the cation-exchangeable clay (thereby forming a zinc carboxylate organoclay).

Still further aspects of the present invention provide a composition, comprising one or more rubbers or plastics; and the above zinc carboxylate clay and/or zinc carboxylate organoclay. For example, the composition may be part of a tire, a roller, a shoe sole, a rubber support, a belt, a roller, a ball, a hose, an automobile part or another rubber or plastic product. Thus, the invention also relates to a method of making a rubber or plastic product, comprising mixing (i) the present zinc carboxylate clay and/or zinc carboxylate organoclay (a "zinc carboxylate (organo)clay") with (ii) one or more rubber or plastic materials to form a zinc carboxylate (organo)clay-containing mixture; and forming the rubber or plastic product from the zinc carboxylate (organo)clay-containing mixture.

The present invention enables the zinc carboxylate (organo)clay to have a zinc ion content from about 1 wt % to about 20 wt %. Zinc carboxylate (organo)clays according to the present invention are generally easier to mill or to break up into fine powder relative to zinc clays produced by conventional methods. Furthermore, zinc carboxylate (organo)clays of the present invention may have a zinc ion content (e.g., a content of zinc ions chemically bound to the clay and substantially insoluble in an aqueous solution comprising ammonia and carbon dioxide, or aqueous ammonium carbonate) that is higher than conventional zinc clays.

In additional embodiments, the present invention provides zinc carboxylate organoclays comprising one or more organic ammonium salt(s) and methods of making zinc carboxylate organoclays comprising one or more organic ammonium salt (s). Such zinc carboxylate organoclays may be even easier to exfoliate during mixing and/or processing steps, enabling easier separation of the layers and/or platelets of the clay, and rendering various beneficial properties like higher hardness, modulus, reversion resistance, heat resistance, etc. to products made from compositions containing the clay.

Compositions comprising a rubber and a zinc carboxylate (organo)clay according to the present invention generally provide improved performance and/or impart special properties to rubber products equal to or better than conventional additives (e.g., precipitated silica or carbon black) for certain rubber products. In addition, it is has been determined that the present zinc carboxylate clays and zinc carboxylate organoclays unexpectedly reduce the rolling resistance of rubber products such as tires, rollers, etc. The present zinc carboxylate clays and zinc carboxylate organoclays may also be useful as fillers and/or reinforcing agents in products made from polymers such as plastics.

These and other advantages of the present invention will become readily apparent from the detailed description of preferred embodiments below.

DETAILED DESCRIPTION

Figure 1:
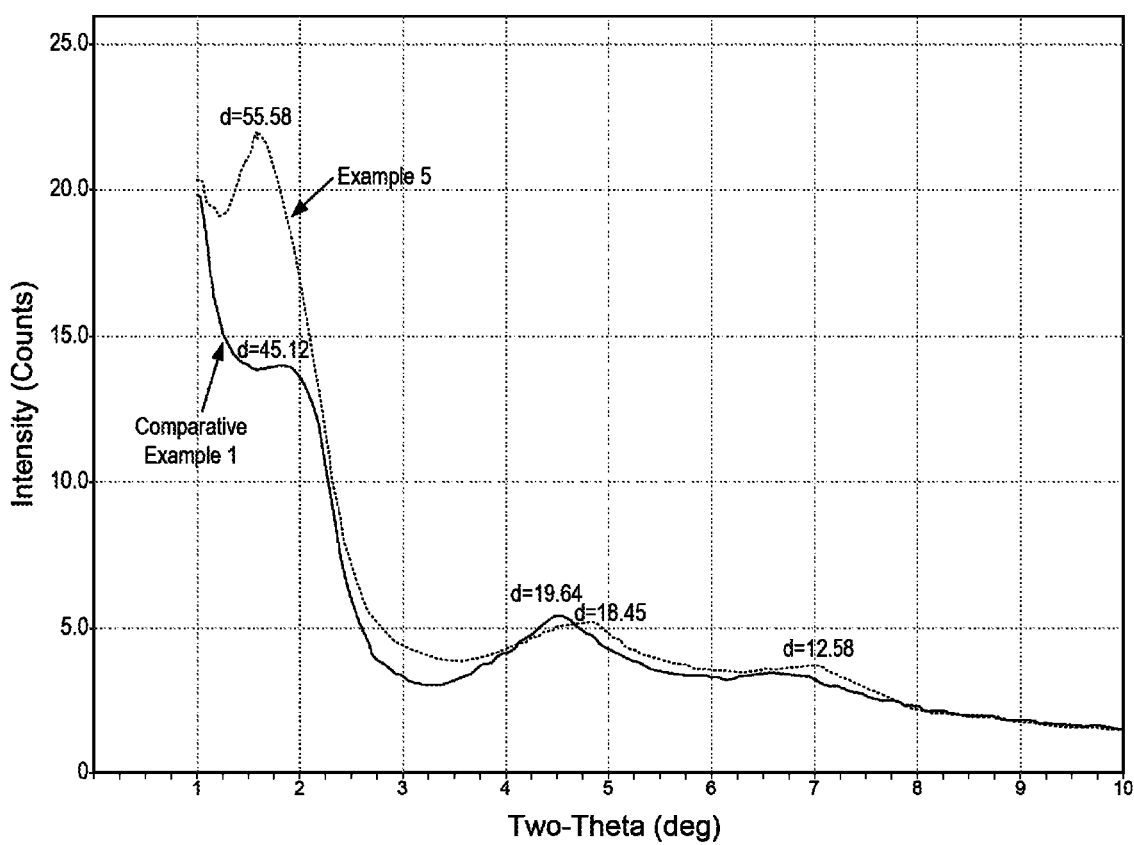
FIG. 1 is an XRD analysis of the quaternary ammonium chloride-treated zinc stearate clay of Example 5, compared to a similar type of quaternary ammonium chloride-treated zinc clay (Sample RAA of Example 1).

Reference will now be made in detail to various embodiments of the invention. While the invention will be described in conjunction with the disclosed embodiments, it will be understood that they are not intended to limit the invention. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent that the present invention may be practiced without these specific details. In other instances, well-known methods, procedures and/or components have not been described in detail so as not to unnecessarily obscure aspects of the present invention.

Like quaternary ammonium salts, zinc carboxylate soaps also intercalate into layered clay materials to increase their $D_{001}$ spacing, and thus aid in their exfoliation. Exfoliated clay is thought to become like nanoparticles, and becomes a good additive in polymeric materials. Stearic acid and other fatty acids generally cost less than quaternary ammonium chlorides, so the economic advantage of the present process is potentially enormous. The following description and examples illustrate various aspects of the invention in greater detail.

Exemplary Methods for Preparation of Zinc Carboxylate Clays

In one preferred method for preparing zinc carboxylate clays, a cation exchangeable clay is mixed with a zinc ion source (such as a zinc ammonia carbonate complex solution) and a carboxylic acid (or salt thereof) to form a zinc clay suspension. Zinc ammonia carbonate complex solution is prepared from water, ammonia, carbon dioxide, and a zinc material, which includes zinc oxide, zinc carbonate, etc. The solution typically has 5 to 15% ammonia, 2 to 10% carbon dioxide, and 2 to 11% zinc. In one embodiment, this solution can be mixed with a layered clay with good cation exchange capacity to make zinc clay. The cation exchange capacity of the clay is usually about 50 to 150 meq of Zn/100 grams of clay. The zinc may be present in the zinc-containing clay in an amount of from 1% to 20% by weight.

In some embodiments, the clay is mixed with water to form a slurry prior to mixing with a zinc solution. The clay may be ground prior to mixing with water to form the slurry. The slurry may subsequently be degritted by, for example, filtering through a mesh screen or by passing through a hydrocyclone with an appropriate cone size to remove undesired coarse components of the clay before mixing with the zinc ammonia complex solution. The mesh of the screen may be essentially any mesh size that removes undesired coarse components of the clay. In one exemplary embodiment, the screen is a 325 mesh screen. The ratio of clay to water in the slurry may be, for example, 1:100 to 1:10 wt:vol, preferably 1:20 to 1:14 wt:vol. However, the ratio of clay to water is not limited, and essentially any suitable ratio may be employed in the preparation of the slurry. In an exemplary embodiment, the clay to water ratio is 1:15 wt:vol.

The zinc ammonia carbonate complex solution may be prepared as described in U.S. Pat. No. 7,635,729 and/or co-pending U.S. patent application Ser. No. 12/346,535 (filed Dec. 30, 2008, the relevant portions of each of which are incorporated herein by reference. The zinc ammonia carbonate complex solution can optionally be replaced with a solution of another zinc ammonia complex, such as a zinc ammine salt, like zinc ammine chloride, zinc ammine sulfate, etc., or a mixture thereof. The zinc ammine salt may comprise a compound of the formula $Zn(NH_3)_2X_n$, where n is 1 or 2, and when n=2, X is F, Cl, Br, I, $NO_3$, CN, OCN, CNO, NCO, or $CO_2CH_3$, and when n=1, X is $SO_4$, $HPO_4$, or $CO_3$. Of course, other monovalent and/or divalent anions compatible with the present methods are also suitable.

The native clay or a slurry thereof may then be combined with the zinc ammonia carbonate complex solution to form a zinc clay suspension. Typically, the zinc ammonia carbonate complex solution is added to the clay slurry. Alternatively, dry clay may be combined with the zinc ammonia carbonate complex or zinc ammine salt solution. The suspension is mixed and maintained under heavy mixing or agitation for a length of time sufficient to allow for absorption of zinc ions by the clay. In a typical embodiment, the suspension is mixed for 1 hour or more, depending on the reactivity of the clay (e.g., 2 hours). The mixing and/or agitation time is not particularly limited, and may be carried out for a length of time sufficient to effect a desired zinc ion content of the product zinc clay up to its maximum cation exchange capacity. The mixture may optionally be heated after the absorption of zinc ion. Heating is preferably conducted at a temperature of from about 50° C. to about 150° C. If desired, the mixture may then be cooled to a temperature of from about 15° C. to about 30° C.

Before the heating process, the zinc clay suspension may then optionally be milled with a suitable wet milling device such as an attritor for a length of time sufficient to provide a particular particle size and/or homogeneity of the suspension and help to incorporate the zinc ion into the clay. Milling may also be performed with a plugmill or a Manton-Gaulin homogenizer (as mentioned in U.S. Pat. No. 5,110,501, the relevant portions of which are incorporated herein by reference).

In one embodiment, the zinc clay is mixed together with a carboxylic acid source (such as a fatty acid or a derivative thereof, such as an alkali metal salt of the fatty acid) to make a zinc carboxylate clay. However, in other embodiments of the present method, a solution of a zinc salt is mixed with the cation-exchangeable clay. For example, the zinc salt may comprise zinc chloride and/or zinc sulfate. In general, the carboxylic acid and the zinc-containing clay can be mixed in a ratio of from 0.05:1 to 0.5:1 by weight.

In an alternative embodiment, the zinc ammonia complex solution can be mixed with a carboxylic or fatty acid first, before it is mixed with the layered clay (e.g., to coagulate and precipitate a zinc carboxylate clay suspension). Before precipitation, the layered clay can be first dissolved or suspended in water and degritted with a wire mesh (as described above), or it can be added dry to the zinc ammonia complex solution/carboxylic acid mixture.

In the present method, the cation-exchangeable clay is preferably a layered clay with good cation ion exchange capacity, and typically a clay having a suitable cation exchange capacity for binding of zinc ions. In some embodiments, the clay may have a cation exchange capacity of from about 50 to about 150 meq/100 gram of clay for binding of zinc or other metal ions. Thus, the cation-exchangeable clay may be selected from smectic clays, calcium montmorillonite, sodium montmorillonite, synthetic montmorillonite, bentonite, bentonite-derived clays, zeolites, saponites, nontronites, beidellites, hecorites, vermiculites, swellable micas and mixtures thereof. The clay may be ground or milled prior to mixing with the zinc ammonia complex solution or zinc salt solution to form the zinc clay suspension. The clay may also be graded or screened after grinding or milling and prior to mixing to remove coarse components.

The carboxylic acids generally include, but are not limited to, carboxylic acids of 3 to 25 carbon atoms, including propionic acid, capric acid, caprylic acid, caproic acid, lauric acid, palmitic acid, stearic acid, other fatty acids (e.g., myristic acid, arachidic acid), etc., and mixtures thereof. Other suitable organic acids include aliphatic $C_5$ to $C_{24}$ aliphatic and/or aromatic carboxylic acids, such as oleic acid, palmitoleic acid, linoleic acid, benzoic acid, 2-methylbenzoic acid, phenylacetic acid, phthalic acid, 1- or 2-naphthoic acid, naphthalic acid, etc.

The zinc- and carboxylic acid-intercalated clay suspension can then be filtered, dried and milled. The zinc carboxylate clay suspension can be filtered, for example, by vacuum filtration. In one embodiment, the retained filter cake may then be dried directly and milled, leaving excess zinc (if any) as zinc oxide and/or zinc carbonate in the zinc carboxylate clay powder. In some embodiments, the filter cake is washed to remove excess zinc. The washing fluid may comprise deionized water, and optionally, ammonia and/or carbon dioxide. The concentration of ammonia and/or carbon dioxide in the washing solution is not particularly limited. Essentially any concentrations of ammonia and/or carbon dioxide may be selected that are effective in removing excess zinc from the filter cake. Washing may be conducted until essentially all ammonium carbonate solution-soluble zinc in the filter cake has been extracted or removed (e.g., until a zinc content in the filtrate reaches a desired level, such as less than 0.5%, less than 0.2% or 0.1%, etc.). The filtrate comprising ammonia, carbon dioxide and/or recovered zinc may be reused and/or recycled to make zinc ammonia carbonate complex solution. Alternatively, zinc and/or ammonia may be recovered from the filtrate by boiling and distillation as described in co-pending U.S. patent application Ser. No. 11/519,949 (filed Sep. 11, 2006).

The filter cake may then be further washed with deionized water and/or dried, preferably at a temperature of from about 50° C. to about 200° C. Drying may be conducted for a length of time sufficient to reduce a moisture content of the zinc carboxylate clay to a desired level, such at less than 1%, less than 0.5% or lower. In some embodiments, the filter cake is then calcined at a temperature of $\geqq 200°$ C., 250° C. or greater, for a length of time sufficient to effect complete drying of the zinc carboxylate clay. If desired, the zinc carboxylate clay product may then be milled to a powder (e.g., as described herein). The milled powder may be further refined by e.g., screening with a mesh screen of suitable gauge to achieve a desired maximum particle size in the milled zinc carboxylate clay. Thereafter, the zinc carboxylate clay is ready to be used in rubber or plastic polymer formulations. Thus, in some embodiments, the method may further comprise milling the clay suspension and/or the zinc carboxylate clay.

Methods for Preparation of Zinc Carboxylate Organoclays

The zinc- and fatty acid-intercalated clay (zinc carboxylate clay) can be further intercalated with one or more quaternary ammonium salts to make a zinc-fatty acid-amine organoclay (e.g., a zinc carboxylate organoclay). One method of applying the quaternary ammonium salt to the zinc carboxylate clay is by spraying it with or without solvent into the dry zinc carboxylate clay, then evaporating the solvent, if necessary, and optionally milling the dry materials. Another method is to add the quaternary ammonium salt, with or without solvent, directly to the freshly precipitated zinc carboxylate clay before the drying and milling steps. In an alternative embodiment, zinc clay prepared according to the methods described above may be reslurried in water before addition of the ammonium salt (which may be added directly or in an aqueous and/or alcoholic solution). As described above, the relative ratio of clay to water in the slurry is not particularly limited. The mixture of the ammonium salts and the zinc clay may then mixed (e.g., in an attritor) for a length of time sufficient to homogenize the mixture.

The quaternary ammonium salts may include ester quaternary ammonium salts, alkoxy alkyl quaternary ammonium salts, trialkyl monomethyl quaternary ammonium salts, dialkyl dimethyl quaternary ammonium salts, etc. The ammonium salt may therefore comprise one or more compounds of the formula $R_4NX$, where each instance of R is independently hydrogen, tallow (e.g., a mixture of saturated, monounsaturated and polyunsaturated $C_{12}$-$C_{24}$ carboxylic acid moieties, in the form of $C_xH_y(CO)$— groups, where x is from 11 to 23 and y is from 2x−5 to 2x+1), $C_1$-$C_{24}$ alkyl, $C_2$-$C_{24}$ alkenyl, $C_6$-$C_{20}$ aryl, $C_7$-$C_{20}$ aralkyl, mono- or dialkyaminoalkylene, $C_2$-$C_{24}$ hydroxyalkyl, $(CO)R^2$, or $(CO)OR^2$, where $R^2$ is $C_1$-$C_{24}$ alkyl, $C_2$-$C_{24}$ alkenyl, $C_6$-$C_{20}$ aryl, or $C_7$-$C_{20}$ aralkyl, and X is a halide, alkylsulfate, nitrate, cyanide cyanate, isocyanate or carboxylate (e.g., a $C_2$-$C_{24}$ carboxylic acid anion such as an acetate). Generally, no more than one R is H (preferably no R group is H), and generally, at least one R group (preferably two R groups) are tallow, $C_8$-$C_{20}$ alkyl, $C_8$-$C_{20}$ alkenyl, or $C_8$-$C_{20}$ hydroxyalkyl. The ammonium salt may be selected from the group consisting of methyl tallow bis-(2-hydroxyethyl)ammonium halides, methyl tallow bis-(2-hydroxyethyl)ammonium alkylsulfates, methyl tallow bis-(2-hydroxyethyl)ammonium nitrate, methyl tallow bis-(2-hydroxyethyl)ammonium hydroxide, dimethyl hydrogenated-tallow (2-ethylhexyl)ammonium halides, dimethyl hydrogenated-tallow (2-ethylhexyl)ammonium alkylsulfates, dimethyl hydrogenated-tallow (2-ethylhexyl)ammonium nitrate, dimethyl hydrogenated-tallow (2-ethylhexyl)ammonium hydroxide, dimethyl (dehydrogenated-tallow) ammonium halides, dimethyl (dehydrogenated-tallow) ammonium alkylsulfates, dimethyl (dehydrogenated-tallow) ammonium nitrate, dimethyl (dehydrogenated-tallow) ammonium hydroxide, dimethyl (dehydrogenated-tallow) ammonium acetate, dimethyl (tallow alkyl)octyl ammonium methylsulfate, dimethyl bis-(hydrogenated tallow alkyl)ammonium chloride, methyl trialkyl ammonium chlorides, trimethyl alkyl ammonium chlorides, dimethyl dialkyl ammonium chlorides, dimethyl alkyl allyl ammonium chlorides, dimethyl diallyl ammonium chlorides, and alkyl benzyl dimethyl ammonium chlorides. Other exemplary salts include (but are not limited to) dimethyl bis-(hydrogenated tallow) ammonium chloride, (hydrogenated tallow alkyl) (2-ethylhexyl)dimethyl ammonium methylsulfate, di-$C_8$-$C_{18}$-alkyl dimethyl ammonium chloride, and bis-(hydrogenated tallow) dimethyl ammonium chloride.

In an alternate embodiment, the quaternary ammonium salts can be generated in situ by adding one or more amines (or a solution thereof) to the reslurried zinc carboxylate clay, then converting the amine(s) to the corresponding ammonium salt(s) by treating the zinc carboxylate clay-amine mixture with an acid (or solution thereof). Suitable acids include mineral acids like hydrochloric or sulfuric acid. Suitable amines include primary, secondary or tertiary amines. Suitable amines may comprise one or more compounds of the formula $R_3N$, where each instance of R is as described above. Exemplary amines include (but are not limited to) laurylamine, butylamine, diethylamine, dipropylamine, methylbutylamine, dialkylaminoalkyl-amines, ethylene diamine, stearylamine, tallow amine, bis(tallow)amines, dimethyl or diethyl tallow amine, and methyl or ethyl bis(tallow)amines. After addition of the ammonium salt(s), or alternatively, addition of the amine(s) and in situ generation of the corresponding ammonium salt(s), the ammonium salt-containing mixture may then be mixed, washed, dried, filtered and/or milled as previously described.

Exemplary Zinc Carboxylate (Organo)Clays

As described above, the zinc ion concentration in the present zinc carboxylate (organo)clay may be from about 2 wt % to about 20 wt %. Zinc ions in the present zinc carboxylate (organo)clays are at least partially chemically bound to the clay, and are substantially insoluble in an aqueous solution of ammonia and carbon dioxide (or ammonium carbonate). In various embodiments, the zinc ion concentration in a zinc carboxylate (organo)clay washed with aqueous ammonia/carbon dioxide and/or deionized water may be from 5 to 12 wt % or higher. Zinc carboxylate (organo)clays produced according to embodiments where the zinc carboxylate (organo)clay is not washed, leaving excess zinc thereon (e.g., as zinc oxide and/or zinc carbonate) may have a zinc concentration from about 4 wt % to about 50 wt % of the product zinc clay. Zinc carboxylate (organo)clays according to the present invention may have a milled powder bulk density of from about 0.2 to about 0.8 g/cm$^3$ (e.g., from about 0.3 to about 0.65 g/cm$^3$) and/or a $D_{001}$ interlayer spacing of from about 20 to about 60 Angstroms or more (e.g., from about 30, 40 or 45 Angstroms to about 60 Angstroms). The large $D_{001}$ interlayer spacing of the present zinc carboxylate (organo)clays provide easier exfoliation of the layered clay during polymer mixing and/or processing steps, resulting in easier separation of the layers and/or platelets of the clay and better mixing of the clay in a composition containing the same.

Zinc carboxylate (organo)clays according to embodiments of the present invention may contain smectic or bentonite clays, as previously described. Zinc carboxylate (organo)clays generally contain one or more carboxylic acids as previously described, and optionally one or more quaternary ammonium salts, intercalated between the clay platelets. The amounts of carboxylic acid(s) and optional ammonium salt(s) present are not particularly limited, and may be selected to provide a desired degree of intercalation and/or $D_{001}$ interlayer spacing based on a target application and/or target properties of the product zinc carboxylate (organo)clay. In exemplary embodiments, the ammonium salt(s) are present in amounts of from 0.1 wt % to 50 wt % (or any value therein) of the zinc carboxylate organoclay.

Exemplary Compositions and Products Containing a Zinc Carboxylate (Organo)Clay, and Methods of Making the Same Zinc carboxylate (organo)clays according to the methods described above can be further processed into compositions such as master batches for rubber and plastic products and parts. Such compositions comprising 5 to 70 wt % zinc carboxylate clay or zinc carboxylate organoclay, with or without added ammonium salts. The rubber compositions may comprise natural or synthetic rubber, processing aids, fillers, etc. The plastic compositions may comprise one or more polymers, such as polyethylene, polypropylene, polystyrene, polycarbonates, polyesters, polyacrylates, polymethacrylates, copolymers thereof, etc., plus optional processing aids, fillers, etc. The relative amounts and/or types of additives and fillers may be selected according to the desired characteristics of the compositions. The compositions may be prepared by mixing the zinc carboxylate (organo)clay, rubber, and other additives to impart special properties and/or other desired characteristics to the composition (where applicable) in a Banbury-type mixer at a shear force and for a length of time sufficient to exfoliate the zinc carboxylate (organo)clay and provide a sufficient degree of mixing.

The present compositions as described may be used to make finished products like tires, belts, shoe soles, rubber sections, rubber or plastic parts (e.g., rubber supports, hoses, automobile parts, etc.), balls, rollers, and other rubber products. The present invention therefore further concerns a method of making a rubber or plastic product, comprising mixing (i) the present zinc carboxylate (organo)clay with (ii) one or more rubber or plastic materials to form a zinc carboxylate (organo)clay-containing mixture; and forming the rubber or plastic product from the zinc carboxylate (organo)clay-containing mixture.

The following examples will further illustrate the present invention.

EXAMPLES

For the following examples, materials, testing procedures and equipment are obtained from the following sources or equivalent sources:

Bentonite clay Pc7—a reportedly sodium activated calcium bentonite clay consisting of over 80% montmorillonite with CEC (cation exchange capacity) over 100 meq/100 grams, supplied by Volclay Siam Co. Ltd, Thailand.

Testing methods and equipment include:
Mooney viscosity—ASTM 1646.
Hardness—ASTM D2240.
Tensile & modulus—ASTM D412.
Heat buildup—ASTM D623.
Rubber Process Analyzer (RPA 2000, Alpha Technology) for G' (elastic modulus) and Tan delta (ratio of viscous modulus to elastic modulus).
Reversion—DIN 53 529.
Attritor—Union Process Inc., Akron, Ohio.
D-Spacing—X-ray diffractometer, Rigaku TTRAX 111.

Example 1

Preparation of Zinc Clay RA and Zinc Organoclay RAA

Zinc ammonia carbonate complex solution (12,000 grams) was prepared, having 8.94% zinc (using technical grade zinc oxide), 10.10% ammonia, and 6.03% carbon dioxide. Slowly, bentonite Pc7 (10,000 grams) was added into 100 liters of water with good agitation, and the mixture was stirred for two hours. The resulting solution was de-gritted with a 325 mesh screen. Then the zinc ammonia carbonate complex solution was added slowly into the solution-like bentonite slurry while continue to agitate. The resulting zinc clay slurry was attrition milled for two hours and then boiled to eliminate substantially all of the ammonia and most of the carbon dioxide. The zinc clay was filtered, then dried at 170° C. The dried cake was attrition milled and sieved through a 200 mesh screen. The zinc clay has the following properties:

| No. | Bulk Density | Zinc % | $D_{001}$ Spacing, Angstroms |
|-----|--------------|--------|------------------------------|
| RA  | 0.83         | 10.29  | 12.3**                       |

A quaternary ammonium chloride is added to the above zinc clay to make a zinc organoclay according to the procedure of U.S. patent application Ser. No. 12/577,370 to obtain zinc organoclay RAA:

| No. | Bulk Density | Zinc % | $D_{001}$ Spacing, Angstroms |
|-----|--------------|--------|------------------------------|
| RAA | 0.43         | 7.29   | 45.12**                      |

$D_{001}$ spacing is measured with a X-ray diffractometer (TTRAX III) from Rigaku, Japan. Sampling W=0.02°; speed 2.4°/min; D-, S- and R-slit=½°, ½° and 0.3 mm, respectively. Target type: Cu; Tube voltage=50 kV, current=300 mA. The results for Sample RAA are shown in FIG. 1.

Example 2

Preparation of Zinc Stearate Clay

Stearic acid (75 grams) was added to 500 gram of zinc clay RA. The mixture was attrition milled for two hours and then heated at 150° C. for one more hour. The product again was attrition milled and then jet milled through a CJ-10 jet mill manufactured by Nisshin Engineering Co. Ltd. of Japan. The final product was sieved through a 200 mesh sieve to produce zinc stearate clay RB. There is some loss of material through dusting at the various milling processes. Its properties are listed below:

| No. | Bulk Density | Zinc % | $D_{001}$ Spacing, Angstroms |
|---|---|---|---|
| RB | 0.45 | 9.1 | 41.7 |

Example 3

Preparation of Zinc Stearate Clay Via Ammonium Stearate

An ammonium stearate solution was prepared by mixing 113.5 grams of stearic acid with 567 grams of ammonia/carbon dioxide solution containing 12% of ammonia and 10% of carbon dioxide. The solution was sprayed onto 756 grams of zinc clay R591, then the mixture was mixed well and heated to 60° C. The resulting powder was heated at 110° C. for 18 hours. The dried powder was attrition milled again and then sieved with a 140 mesh sieve. The product was jet milled with the Nissen jet mill (see Example 2) to produce zinc stearate clay RC. There is some loss of material through dusting at the various milling processes. Its properties are listed below:

| No. | Bulk Density | Zinc % | $D_{001}$ Spacing, Angstroms |
|---|---|---|---|
| RC | 0.33 | 9.71 | 47.7 |

Example 4

Preparation of Zinc Stearate Clay Via Zinc Stearate

Zinc ammonia carbonate complex solution (3,640 g) was prepared, having 8.67% zinc, 10.54% ammonia and 5.84% carbon dioxide. Stearic acid (450 grams) was then added into the solution with good agitation. The solution was heated to 100° C., at which point the solution gels slightly. Then bentonite clay (3 kg) was added to 40 liters of water. The solution-like slurry was agitated well and degritted with a 325 mesh screen. The zinc stearate solution was then added slowly into the bentonite slurry with good agitation. The bentonite coagulates and precipitates out from the solution-like slurry. The resulting slurry was attrition milled for two hours. The slurry was filtered, and the filter cake dried at 110° C. for 72 hours. The dried powder was attrition milled again, and the product sieved with a 140 mesh sieve. The resulting product was jet milled with the Nissen jet mill (see Example 2) to produce zinc stearate clay RD. There is some loss of material through dusting at the various milling processes. Its properties are listed below:

| No. | Bulk Density | Zinc % | $D_{001}$ Spacing, Angstroms |
|---|---|---|---|
| RD | 0.54 | 9.5 | 60.8 |

Figure 2:
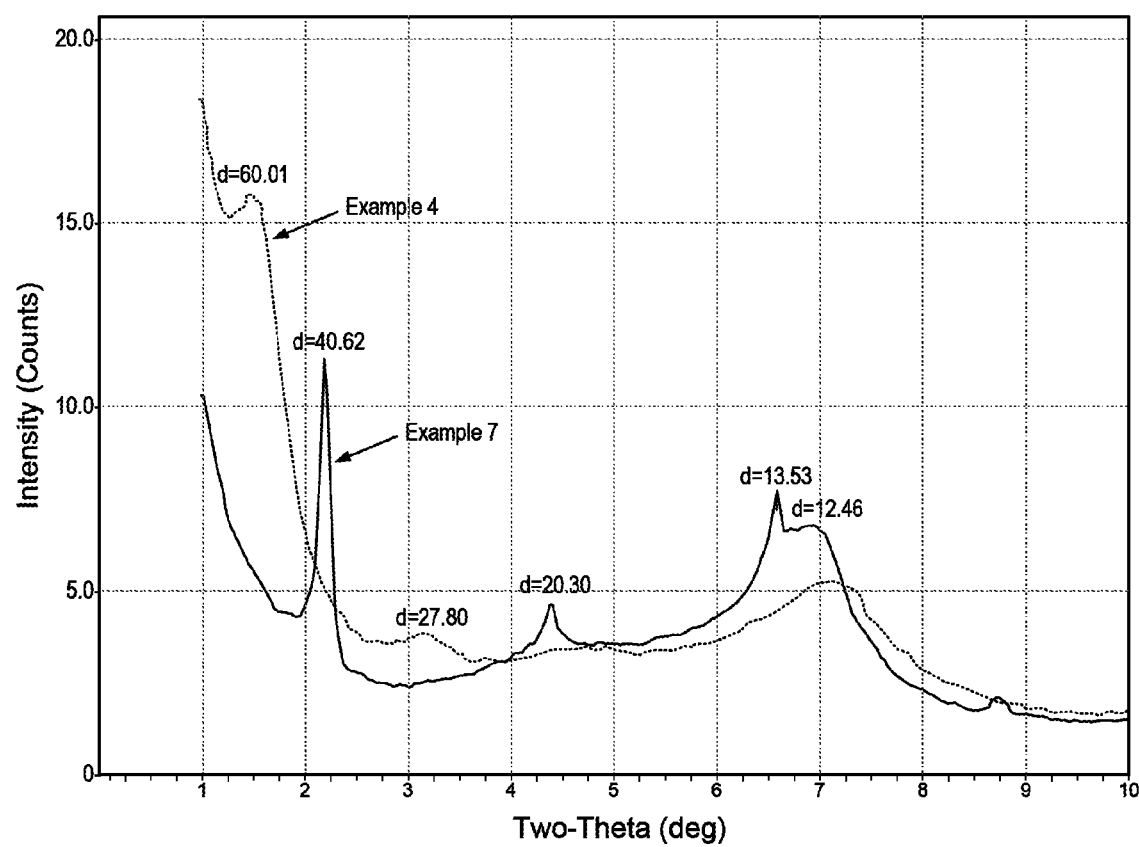
FIG. 2 is an XRD analysis of the zinc stearate clay of Example 4, with the zinc stearate clay of Example 7, which is made according to the method of US Pat. Appl. Publ. No. 2009/0199945A1.

FIG. 2 shows an XRD analysis of the zinc stearate clay of Example 4, as compared with the zinc stearate clay of Example 7, which is made according to the method of US Pat. Appl. Publ. No. 2009/0199945A1. The zinc ammonia carbonate stearate mixture of Example 4 greatly facilitates the coagulation and precipitation of the bentonite. Mixing commercial zinc stearate powder with the bentonite/water mixture (see Example 7) will not coagulate or precipitate the bentonite from the solution-like mixture of the bentonite unless the mixture is subjected to vigorous and extended agitation and/or heating at 90° C. or over. The inability to precipitate the bentonite clay mixture in water deprives a chance to eliminate certain impurities like sand or soil in the bentonite clay. The stoichiometrically excess zinc (as compared with the amount of stearic acid) in the zinc ammonia carbonate stearate mixture may also facilitate the precipitation of bentonite and bring benefit to a rubber formulation containing the zinc stearate clay prepared from a zinc ammonia carbonate stearate mixture.

Example 5

Treating Zinc Stearate Clay with a Quaternary Ammonium Chloride

Dehydrogenated tallow dimethyl ammonium chloride (400 grams) from Evonik Industries, USA was mixed with 400 grams of isopropanol, then the resulting mixture was mixed well with 1,000 g of the zinc stearate clay RD. The mixture was dried at 80° C. for 48 hours. The dry powder was attrition milled for two hours and sieved through a 140 mesh screen. The screened powder was jet milled to obtain an amine chloride-treated zinc stearate clay RE having the following properties:

| No. | Bulk Density | Zinc % | $D_{001}$ Spacing, Angstroms |
|---|---|---|---|
| RE | 0.34 | 7.3% | 55.6 |

There is some loss of material through dusting at the various milling processes. FIG. 1 is an XRD analysis of the quaternary ammonium chloride-treated zinc stearate clay of Example 5, compared to a quaternary ammonium chloride-treated zinc clay (e.g., Sample RAA made with zinc clay and dehydrogenated tallow dimethyl ammonium chloride, without stearic acid). As shown in FIG. 1, the present method produces a zinc organoclay with much better intercalation. The degree of intercalation of the quaternary ammonium chloride-treated zinc stearate clay is greatly enhanced. The level of intercalation of zinc stearate clays of Examples 2, 3, 4 and 5 are in ascending order, with that from Example 5 being the best of the four Examples. The zinc stearate also helps the dispersion of the fine clay into a rubber molding mixture and greatly reduces the chance and/or extent of "white spot," which is associated with coagulation of very fine particles of organic clay in the rubber mixture. This is especially evident when laurylammonium chloride is used as the intercalation agent.

Example 6

Preparation of Zinc Stearate Clay from Zinc Clay Made from Zinc Sulfate

A zinc clay was prepared by adding 2.5 kg of bentonite Pc7 into 40 liters of water and agitating well. The solution/suspension was degritted by passing it through a 325 mesh screen. Then, a solution of 633 grams of zinc sulfate heptahydrate in 2000 ml of water was added to the clay slurry, and the mixture was attrition milled for two hours. The filter cake was washed, filtered, and dried. The dry powder was attrition milled and then sieved and jet milled with a Nissen jet mill (see Example 2). The resulting zinc clay has 5.26% zinc and a $D_{001}$ spacing of 15.34.

Stearic acid (75 grams) was mixed with 500 grams of the zinc clay above, and the mixture was attrition milled for two hours. After heating the mixture at 150° C., it was attrition milled for one more hour. The fine powder was sieved with a 200 mesh screen. There is some loss of material through dusting at the various milling processes. The resulting zinc stearate clay RF has the following properties:

| No. | Bulk Density | Zinc % | $D_{001}$ Spacing, Angstroms |
|---|---|---|---|
| RF | 0.62 | 4.59% | 48 |

The $D_{001}$ spacing of the zinc stearate clay RF is also increased, similar to Example 2.

Example 7

Preparation of Zinc Stearate Clay According to US Pat. Appl. Publ. No. 2009/0199945 A1

Commercial zinc stearate from Formosa Chemical Co. Ltd., Thailand (60 grams) was added to 400 grams of bentonite clay Pc7. The mixture was attrition milled at room temperature for about 30 minutes with 3 mm zirconium balls at 500 rpm, and then with 8 mm zirconium balls for two hours, and jet milled through a CJ-10 jet mill manufactured by Nisshin Engineering Co. Ltd. of Japan. The final product was sieved through a 140 mesh sieve and 430 grams of fine zinc stearate clay (No. RG) was obtained. There is some loss of material through dusting at the milling processes. Its properties are listed below:

| No. | Bulk Density | Zinc % | $D_{001}$ Spacing, Angstroms |
|---|---|---|---|
| RG | 0.46 | 1.95 | 40.6 |

FIG. 2 compares the zinc stearate clay of Example 4 with the zinc stearate clay of Example 7 by XRD analysis. Both zinc organoclays include zinc stearate, but the degree of intercalation of Sample RD in Example 4 (exemplifying the present invention) is much better than the zinc organoclay of Example 7, as shown in the wide angle X-ray diffraction patterns shown in FIG. 2.

Example 8

Preparation of Zinc Clay with Lower Molecular Weight Fatty Acids

A caprylic/capric acid blend (containing a mixture of 40-50% caprylic acid and 38-45% capric acid, 227 grams) from Imperial Industrial Chemical Co. Ltd in Thailand was mixed with 500 gram of the zinc clay from Example 1 (RA). The procedure of Example 2 was followed and a zinc carboxylate clay RH intercalated with a blend of caprylic and capric acids was obtained. The resulting zinc carboxylate clay has the following properties:

| No. | Bulk Density | Zinc % | $D_{001}$ Spacing, Angstroms |
|---|---|---|---|
| RH | 0.57 | 5.36 | 34.7 |

The $D_{001}$ spacing of the zinc caprylic/capric acid salt clay is increased significantly compared with the $D_{001}$ spacing of the original zinc clay RA.

Example 9

Preparation of Other Metallic Stearate Clay

An ammonium stearate solution was prepared with 6.5 liters of water, 19.5 grams of ammonia, 13.6 grams of carbon dioxide and 137.5 grams of stearic acid. The solution was heated to 60° C. and agitated well. Medical grade calcium montmorillonite (550 grams, from R & L Chemical Industry, Inner Mongolia, China) was added to the solution with good agitation. The montmorillonite coagulated and precipitated out. The slurry was heated to at 80° C. for 1 hour to get rid of the remaining ammonia, and then the slurry was attrition milled for two hours. The slurry was filtered, and the filter cake was dried at 110° C. for 18 hours. The dried powder was attrition milled again and the product sieved with a 200 mesh sieve to produce calcium stearate clay No. RI. There is some loss of material through dusting at the various milling processes. Its properties are listed below:

| No. | Bulk Density | Zinc % | $D_{001}$ Spacing, Angstroms |
|---|---|---|---|
| RI | 0.58 | 0% | 14.3 |

The $D_{001}$ spacing is not increased without the involvement of zinc ion.

Example 10

Using Zinc Stearate Clays in a Rubber Formulation

Tire tread formulations were mixed in two stages. The first stage consisted of ingredients as shown below:

| Recipe | 706D | 706A | 706B | US '945 | control |
|---|---|---|---|---|---|
| Mixing method** | CC | CC | CC | CC | BB |
| Natural rubber, STR 5L | 100 | 100 | 100 | 100 | 100 |
| Zinc stearate clay RB | 8 | — | — | — | — |
| Zinc stearate clay RC | — | 8 | — | — | — |
| Zinc stearate clay RD | — | — | 8 | — | — |
| Zinc stearate clay RG | — | — | — | 8 | — |
| Carbon Black N330 | 34.5 | 34.5 | 34.5 | 34.5 | 34.5 |
| pp silica, VN3 | 10 | 10 | 10 | 10 | 17 |
| PEG 4000 | 2 | 2 | 2 | 2 | 2 |
| Aromatic oil | 4 | 4 | 4 | 4 | 4 |
| Stearic acid | 2 | 2 | 2 | 2 | 2 |
| Santoflex 6PPD | 1 | 1 | 1 | 1 | 1 |

| | Mixing Time (min) | |
|---|---|---|
| Mixing method | BB | CC |
| Rubber | 0.5 | 0.5 |

-continued

| | | |
|---|---|---|
| Added Clay | none | 2 |
| Carbon Black | 4 | 1.5 |
| Silica | 4 | 4 |
| PEG | with silica | with silica |
| Processing Oil (stearic acid, 6PPd) | 3 | 3 |
| Total Time (min) | 11.5 | 11.0 |

**The above ingredients are mixed in the following methods BB and CC:carbon black, silica (if any), PEG (if any), processing oil, stearic acid, and antioxidant are added in sequence, as listed, in a 3 liter Banbury mixer with blades rotating at 50 rpm with heating, rising gradually from about 80° C. to about 140° C. over 11.5 minutes in a first stage mixing. The mixing methods BB and CC are as shown below:

In the second stage, 4 phr of white seal zinc oxide was then added to each of the formulations in a two roll mill at 100° C. rotor temperature over 6.5 minutes. Then 2.5 phr of an accelerator (TBBS) and 2.5 phr of sulfur were added to each formulation at 70 to 80° C. rotor temperature over 4 minutes. The formulations were then cured at 160° C. for 20 minutes, yielding tread compositions with the following characteristics:

| | Invention | | | US '945 | control |
|---|---|---|---|---|---|
| Clay in Recipe | RB | RC | RD | RG | (none) |
| Hardness, Shore A | 63.54 | 66.37 | 66.70 | 66.49 | 63.97 |
| 100% modulus, MPa | 2.78 | 3.03 | 2.93 | 2.91 | 2.60 |
| 200% Modulus, MPa | 7.19 | 8.00 | 7.76 | 7.47 | 7.05 |
| Tensile Strength, MPa | 21.51 | 21.19 | 21.08 | 20.64 | 21.73 |
| Elongation at break, % | 423 | 384 | 391 | 402 | 432 |
| Heat buildup, ° C. | 14.33 | 12.80 | 12.68 | 14.03 | 15.03 |
| Tan delta at 10 Hz, 70° C., 10% strain, RPA | 0.074 | 0.074 | 0.073 | 0.076 | 0.080 |
| Reversion, % DIN 53 529 | 19.38 | 18.46 | 19.12 | 22.00 | 26.19 |

Being mostly natural products, zinc stearate clay can replace silica in a conventional rubber formulation, providing slightly better hardness, modulus, and reversion resistance than a comparative rubber formulation without such a clay. Zinc stearate clay can further reduce tan delta and heat build-up of rubber compounds, which means cooler running tires with lower rolling resistance and greater energy savings. As zinc stearate and stearic acid have been widely used in rubber and plastic formulation for many years, they are believed to be more compatible with rubber formulations than quaternary ammonium salts.

Because of their large D spacing between layers ($D_{001}$), zinc carboxylate (organo)clays are as good as some of the organoclays for rubber and for plastic. Actually, some organic clays are reported to provide no reduction in tan delta at about 10 Hz, 10% strain, so the rolling resistance of tires made with such clays is not necessarily reduced (see Table 6, U.S. Pat. No. 7,342,065 B2, and Table 2, U.S. Pat. No. 6,858,665 B2). With a zinc stearate organoclay like sample RE of Example 5, the modulus at 100% elongation of the rubber sample can be increased 40% or more over the control sample as shown in the current Example.

CONCLUSION/SUMMARY

Thus, the invention concerns zinc carboxylate clays and zinc carboxylate organoclays, methods of making zinc carboxylate (organo)clays, and various applications of such zinc clays, including applications in rubber and other polymer materials and the like, in which the zinc carboxylate (organo) clays function, e.g., as one or more of an anti-reversion agent, a vulcanization activator and/or accelerator, a rheology modifying agent, a filler and/or a reinforcing agent for rubber or plastics (especially in tires). The zinc carboxylate (organo) clays of the present invention may afford a higher zinc content in zinc clays relative those produced by conventional methods. Thus, products containing the present zinc clays may enjoy similar or better properties than comparative products that include a zinc clay prepared by conventional methods (e.g., as disclosed by US Pat. Appl. Publ. No. 2009/0199945 A1).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for preparing a zinc carboxylate clay, comprising:
   a) mixing (i) a zinc source comprising a zinc ammonia carbonate solution with (ii) a cation-exchangeable clay having a cation exchange capacity of from 50 milliequivalents per 100° rams of clay to about 150 milliequivalents per 100 grams of clay to form a zinc-containing cation exchangeable clay;
   b) mixing (i) a carboxylic acid or an ammonium salt of the carboxylic acid with (ii) the zinc-containing cation exchangeable clay to form a zinc-carboxylic acid clay composition, wherein at least 50 milliequivalents of zinc per 100 grams of the zinc-containing cation exchangeable clay are insoluble in an aqueous solution of ammonia and carbon dioxide;
   c) milling the zinc-carboxylic acid clay composition;
   d) heating the zinc-carboxylic acid clay composition under conditions sufficient to intercalate the carboxylic acid into the zinc-containing cation exchangeable clay and form the zinc carboxylate clay; and
   e) optionally milling the zinc carboxylate clay.

2. The method of claim 1, wherein the carboxylic acid is selected from the group consisting of $C_5$ to $C_{24}$ aliphatic and aromatic carboxylic acids.

3. A method for preparing a zinc carboxylate organoclay, comprising:
   a) performing the method of claim 1;
   b) mixing an amine or an ammonium salt with the zinc carboxylate clay with or without a solvent or solvents and under conditions sufficient to intercalate the amine or ammonium salt into the zinc carboxylate clay and form the zinc carboxylate organoclay; and
   c) optionally drying or milling the zinc carboxylate organoclay.

4. The method of claim 1, wherein said carboxylic acid is stearic acid, caprylic acid, capric acid, or oleic acid.

5. The method of claim 1, wherein said cation-exchangeable clay is selected from the group consisting of smectic clay, calcium montmorillonite, sodium montmorillonite, synthetic montmorillonite, bentonite, zeolites, saponites, nontronites, beidellites, hecorites, vermiculites, swellable micas and mixtures thereof.

6. The method of claim 1, wherein said carboxylic acid and said zinc-containing cation exchangeable clay are mixed in a ratio of from 0.05:1 to 0.5:1 by weight, and zinc is present in the zinc carboxylate clay in an amount of from 1% to 20% by weight.

7. The method of claim 3, wherein said method comprises mixing said amine or ammonium salt with the zinc carboxylate clay under conditions sufficient to intercalate the amine or ammonium salt into the zinc carboxylate clay.

8. The method of claim 1, wherein said zinc carboxylate clay contains from about 1 wt % to about 20 wt % of said zinc ion, and said zinc ions are substantially insoluble in an aqueous solution of ammonia and carbon dioxide water.

9. The method of claim 3, wherein the ammonium salt is a quaternary ammonium salt, and the amine is selected from the group consisting of laurylamine, butylamine, diethylamine, dipropylamine, methylbutylamine, dialkylaminoalkyl-amines, ethylene diamine, stearylamine, tallow amine, bis(tallow)amines, dimethyl tallow amine, diethyl tallow amine, methyl bis(tallow)amines, and ethyl bis(tallow)amines.

10. The method of claim 1, wherein said zinc-containing cation exchangeable clay comprises a smectite clay.

11. A method for preparing a zinc carboxylate clay, comprising:
    a) mixing (i) a carboxylic acid and (ii) a zinc ammonia carbonate complex solution to form a zinc carboxylate solution;
    b) adding a cation exchangeable clay having a cation exchange capacity of from 50 milliequivalents per 100 grams of clay to about 150 milliequivalents per 100 grams of clay into the zinc carboxylate solution to form a mixture, and mixing the mixture until the zinc carboxylate clay coagulates and precipitates;
    c) optionally heating the mixture to drive out the ammonia and carbon dioxide;
    d) optionally attrition milling the mixture to form the zinc carboxylate clay; and
    e) washing, filtering, drying and milling the zinc carboxylate clay.

12. The method of claim 11, wherein the carboxylic acid is selected from the group consisting of $C_5$ to $C_{24}$ aliphatic and aromatic carboxylic acids.

13. A method for preparing a zinc carboxylate organoclay, comprising:
    a) performing the method of claim 11; and
    b) mixing an amine or an ammonium salt with the zinc carboxylate clay with or without a solvent or solvents and under conditions sufficient to intercalate the amine or ammonium salt into the zinc carboxylate clay and form the zinc carboxylate organoclay; and
    c) optionally drying or milling the zinc carboxylate organoclay.

14. The method of claim 11, wherein said cation-exchangeable clay is selected from the group consisting of smectic clays, calcium montmorillonite, sodium montmorillonite, synthetic montmorillonite, bentonite, zeolites, saponites, nontronites, beidellites, hecorites, vermiculites, swellable micas and mixtures thereof.

15. The method of claim 11, wherein said carboxylic acid and said cation exchangeable clay are mixed in a ratio of from 0.05:1 to 0.5:1 by weight, and zinc is present in the zinc carboxylate clay in an amount of from 1% to 20% by weight.

16. The method of claim 13, wherein said method comprises mixing said amine or ammonium salt with the zinc carboxylate clay under conditions sufficient to intercalate the amine or ammonium salt into the zinc carboxylate clay.

17. The method of claim 11, wherein said zinc carboxylate clay contains from about 1 wt % to about 20 wt % of said zinc ion, and said zinc ions are substantially insoluble in an aqueous solution of ammonia and carbon dioxide water.

18. The method of claim 11, wherein the carboxylic acid is selected from the group consisting of stearic acid, caprylic acid, capric acid, and oleic acid.

19. The method of claim 13, wherein the ammonium salt is a quaternary ammonium salt, and the amine is selected from the group consisting of laurylamine, butylamine, diethylamine, dipropylamine, methylbutylamine, dialkylaminoalkyl-amines, ethylene diamine, stearylamine, tallow amine, bis(tallow)amines, dimethyl tallow amine, diethyl tallow amine, methyl bis(tallow)amines, and ethyl bis(tallow)amines.

20. The method of claim 11, wherein said cation exchangeable clay is a smectite clay.

21. The method of claim 11, wherein adding said cation exchangeable clay comprises adding a slurry of said cation exchangeable clay.

* * * * *